United States Patent [19]
Berfield et al.

[11] Patent Number: 4,635,951
[45] Date of Patent: Jan. 13, 1987

[54] DOLLY BUMPER

[75] Inventors: Robert C. Berfield, Jersey Shore; Robert L. Crevling, Jr., Williamsport, both of Pa.

[73] Assignee: Shop-Vac Corporation, Williamport, Pa.

[21] Appl. No.: 757,081

[22] Filed: Jul. 19, 1985

[51] Int. Cl.$^4$ .............................................. B62B 3/10
[52] U.S. Cl. .......................... 280/47.34; 280/79.1 A; 280/710
[58] Field of Search .......... 280/79.1 R, 47.34, 79.1 A, 280/79.2, 762, 770; 293/102, 121 X, 126 X, 142, 144, 155, 143 X; 248/129, DIG. 7, 345.1 X, 615 X

[56] References Cited

U.S. PATENT DOCUMENTS

| | | | |
|---|---|---|---|
| 1,744,408 | 1/1930 | Millard | 293/144 |
| 2,930,561 | 3/1960 | Bittle | 248/DIG. 7 |
| 2,947,548 | 8/1960 | Bard | 280/79.2 |

FOREIGN PATENT DOCUMENTS 6408 of 1900 United Kingdom ............... 280/79.1

Primary Examiner—John J. Love
Assistant Examiner—Richard Camby
Attorney, Agent, or Firm—Ostrolenk, Faber, Gerb & Soffen

[57] ABSTRACT

A bumper for a dolly or hand cart includes a protective outer surface portion which extends around the outer side of the cart frame to protect against damage in the event of a collision. The frame supports a container such as a cylindrical tank. Connected to the outer surface portion at each of its ends is a securing element which includes a horizontal portion extending over a section of the cart frame below the container. At the inner end of the horizontal portion is a locking portion which may extend downward along the inner side of the cart frame. Because the securing element extends between the frame and the container, the weight of the container prevents removal of the bumper. Vertical ribs between the protective outer surface portion and the frame provide rigidity to the bumper and absorb the impact upon occurrence of a collision.

17 Claims, 8 Drawing Figures

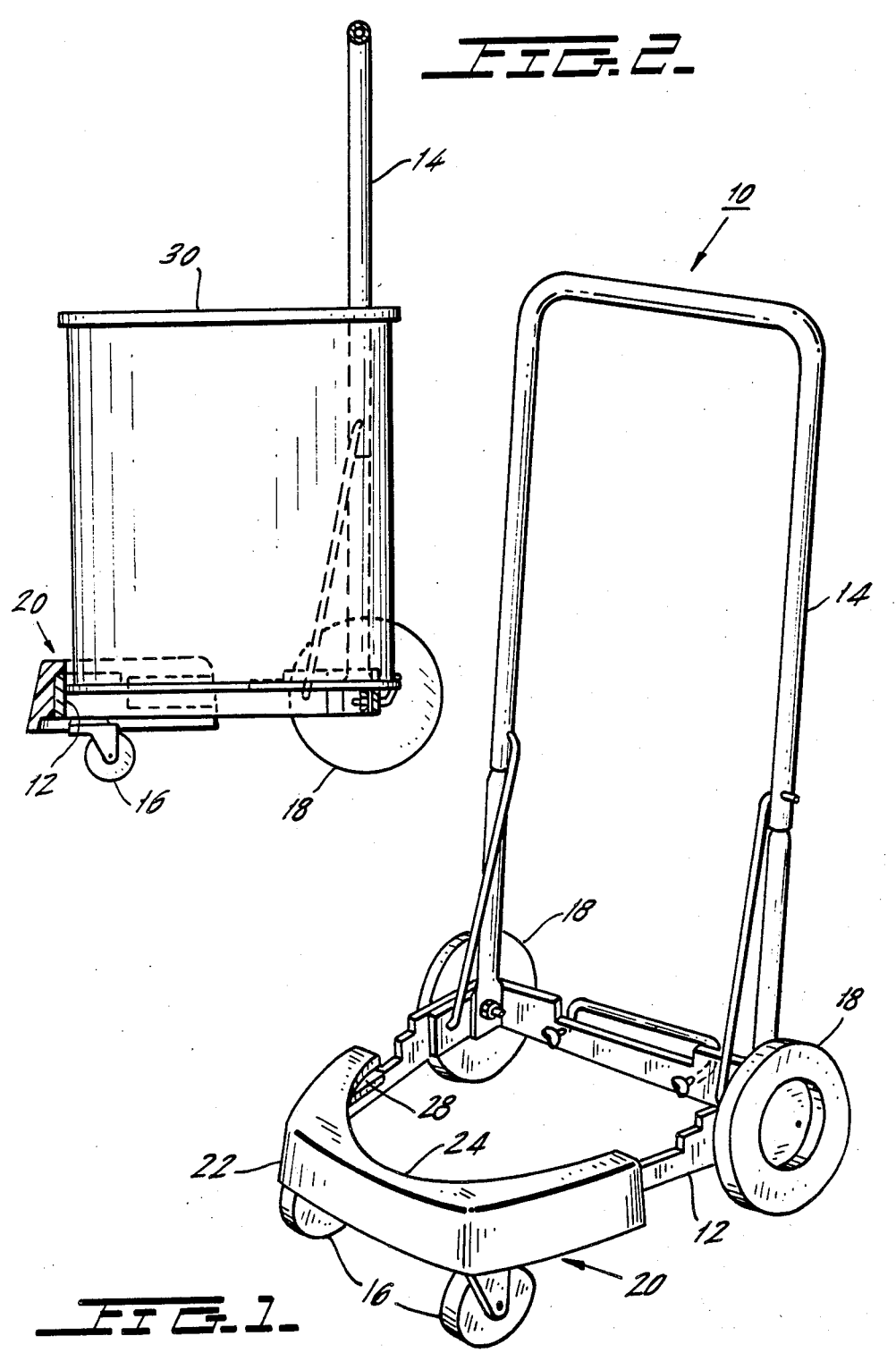

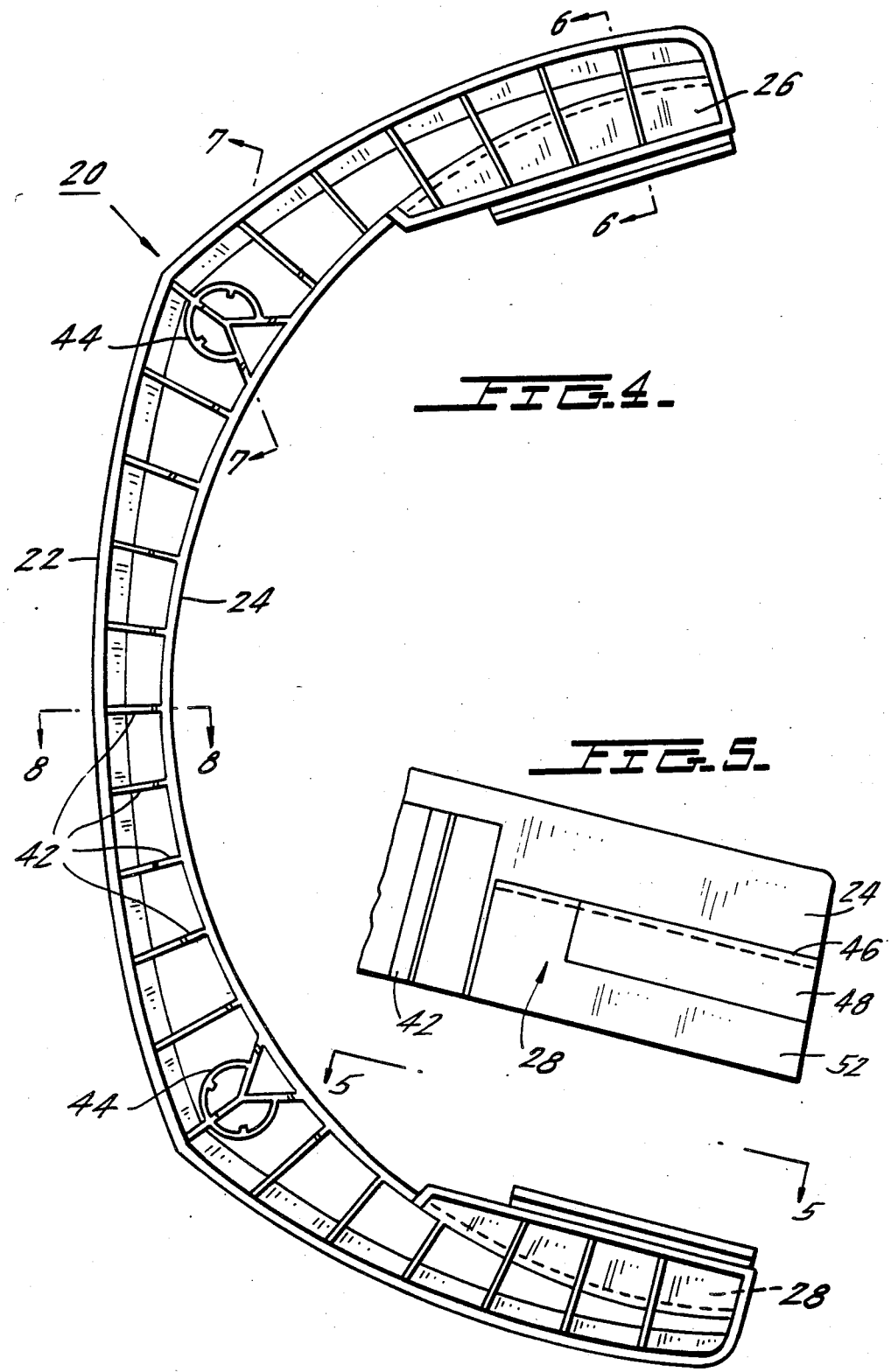

DOLLY BUMPER

BACKGROUND OF THE INVENTION

The present invention relates generally to a hand cart or dolly which supports a tank, barrel or similar container. More particularly, the present invention relates to a bumper mounted on such a cart for reducing damage from contact between the frame of the cart and walls, furniture and similar objects.

Carts or dollies for transporting barrels or tanks standing on end are well known. One or more bumpers may be provided; mounted to the frame of the cart, for protecting against damage in the event of a collision. Such a bumper may cover a caster assembly, as disclosed in coassigned U.S. application Ser. No. 670,068, filed Nov. 13, 1984. That bumper can only be replaced, however, by removal of the caster wheel.

It would be advantageous to provide a bumper which is easily replaceable but is firmly held in place.

SUMMARY OF THE INVENTION

The present invention provides a bumper for a cart or dolly which supports a container such as a tank or barrel. The bumper is inexpensive to manufacture, durable, relatively rigid, easily replaceable, and serves to absorb the impact in case of a collision between the cart and a wall, furniture, or other similar objects. Although the bumper is supported on the same frame as the container, the bumper may fit around half the circumference of the container to provide protection for both the container and the frame. Although the bumper is easily replaceable, it cannot be removed while the container is on the frame.

The bumper according to the present invention includes an outer surface portion positioned at the outer side of the frame of a cart in order to protect the latter and other objects from damage in the event of collisions between the cart and such object. This outer surface portion is connected to a securing element for securing the bumper to the cart frame. The securing element has a generally horizontal portion positioned between the container and the cart frame with the inner end of the horizontal portion disposed inside the cart frame. The securing element also has a locking portion on the inner end of the horizontal portion which prevents the removal of the bumper when the container is on the frame.

The bumper may be made from a plastic material, with ribs which provide rigidity to strengthen the bumper. A bumper for use with a cart frame which has a generally vertical outer side may include both a generally vertical outer surface portion and a top covering which extends over the frame, thereby covering the protected part of the cart frame. Vertical ribs may be provided between the generally vertical outer surface portion of the bumper and the generally vertical outer side of the frame in order to absorb impact upon collision.

The container on the cart will have a wall disposed toward the bumper, and the top covering of the bumper may have an inner edge which is shaped to extend generally parallel to the wall of the container. For example, if the container is cylindrical, the inner edge of the bumper may be substantially semi-circular, extending around half of the container. The frame, on the other hand, will extend under the container rather than around its wall, with the upper edge of the frame being below and spaced apart from the container along a part of its length. The generally horizontal portion of the securing element may extend through the opening defined between the frame and the container, while the locking portion may be a vertically extending piece which fits against the inner side of the frame at the inner end of the generally horizontal portion. The securing element may also include a generally vertical inner wall on the outer side of the frame opposite the locking element, for defining a slot which fits over the frame.

The bumper according to the present invention thus provides protection in the event of a collision, both for the frame and container on the cart and also for the objects with which the cart may collide. Although the bumper is held firmly in place by the weight of the container on the cart, if the bumper is damaged or destroyed by a collision, it can be easily replaced when the container is lifted off of the cart.

These and other objects, features and advantages of the present invention will become apparent from the following description, together with the accompanying drawings and the appended claims.

BRIEF DESCRIPTION OF THE DRAWINGS

FIG. 1 is a perspective side view of a cart with the bumper of the present invention resting on its frame.

FIG. 2 is a side view in partial cross-section showing the bumper according to the present invention on a cart holding a container.

FIG. 4 is a bottom view of the bumper according to the present invention.

FIG. 5 is a detailed view of the locking element of the bumper of FIG. 4, as seen from the line 5—5.

DETAILED DESCRIPTION OF THE PREFERRED EMBODIMENTS

Figure 3:
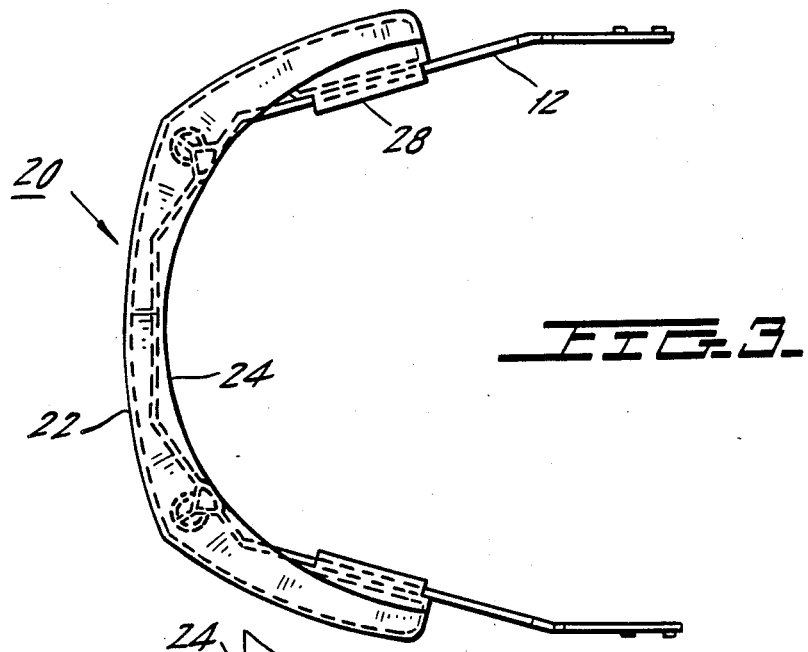
FIG. 3 is a top view showing the bumper of the present invention on the frame of a cart.

The general features of the bumper according to the present invention can be understood from FIGS. 1 and 2. Generally, cart or dolly 10 may be of the type disclosed in co-pending application Ser. No. 703,088, filed Feb. 19, 1985, and assigned to the assignee of the present invention, which is incorporated herein by reference.

Cart 10, as shown in FIGS. 1 and 2, has a frame 12 which extends generally horizontally and which has a handle 14 mounted to its rear side. Frame 12 is supported at its front on swivel-type caster wheels 16 and at its rear by larger wheels 18. Its lateral sides extend under container 30 and are connected at their front ends by a front side.

In use, cart 10 will typically be moved by an operator standing at its rear behind handle 14. Therefore, the front side of the frame 12 in the area above wheels 16 will be most likely to collide with furniture, walls, and other objects during movement. Bumper 20 extending around the outer side of the front part of frame 12 provides protection in the event of such a collision, both for the frame 12 and for the object with which it may collide. As shown in FIG. 2, when container 30, in this case a cylindrical container which may be used, for example, as a vacuum cleaner tank, is positioned on frame 12, bumper 20 extends nearly half-way around container 30, so that the inner edge of bumper 20 is nearly semi-circular. In general, the inner edge of bumper 20 will be shaped so as to be parallel to the outer wall of container 30.

FIGS. 3 and 4 show the shape of bumper 20 in greater detail. In FIG. 3, bumper 20 is shown from above resting on frame 12, while in FIG. 4, bumper 20 is shown from below. In each case, however, the basic shape of bumper 20 includes an outer surface portion 22 which extends around the protected part of frame 12, having an inner edge 24 which extends generally parallel to the outer wall of container 30 and, in FIGS. 3 and 4, is generally semi-circular. Extending inward across each lateral side of the frame 12 at each end of the inner edge are respective securing elements 26, 28 connected to the outer surface portion 22 and extending over a section of the respective lateral side of frame 12 below and spaced apart from container 30. FIG. 4 also shows ribs 42 formed between outer surface portion 22 and the vertically extending frame 12 to provide rigidity to bumper 20 and to absorb the impact upon the occurrence of a collision. As shown in FIG. 4, ribs 42 generally extend vertically, and some of the ribs 42 connect to securing elements 26 and 28. Bumper 20 also includes specially shaped ribs 44 for fitting around the mounting of caster wheels 16, as discussed in greater detail below in relation to FIG. 7.

Figure 6:
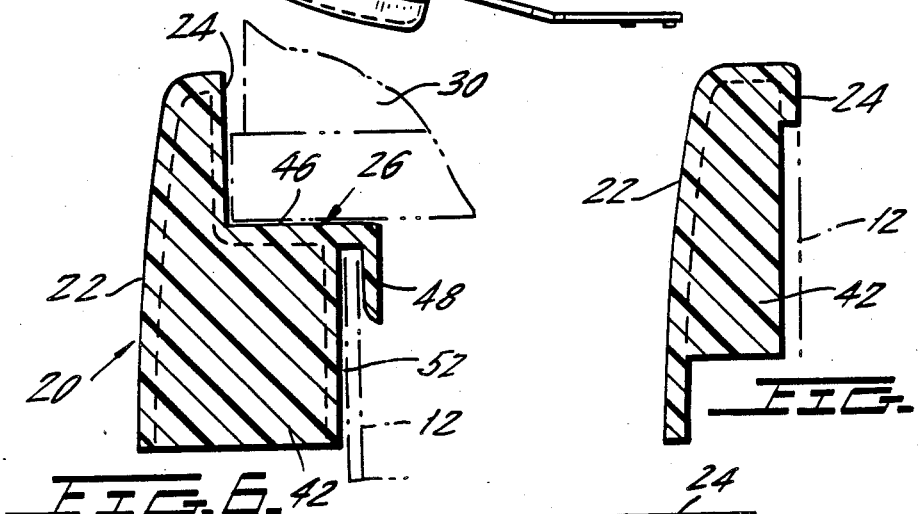
FIG. 6 is a cross-section of the bumper of FIG. 4 along the line 6—6 and showing the bumper held in place by a container.

The structure of the securing elements 26, 28 are shown in greater detail in FIGS. 5 and 6. FIG. 5 is a view from the line 5—5 in FIG. 4, showing one of the ribs 42 adjacent to securing element 28. As shown, securing element 28 includes a generally horizontally extending portion 46 extending inward across the section of the respective lateral side of frame 12 under and spaced apart from container 30, as shown more clearly in FIG. 6, which is a cross-sectional view of bumper 20 taken through securing element 26. At the inner end of horizontally extending portion 46 is locking portion 48, which extends downward along the inner side of frame 12, forming a slot between locking portion 48 and an inner wall 52 of bumper 20 into which frame 12 fits. As a result, as shown in FIG. 6, when container 30 is resting on frame 12, horizontally extending portion 46 extends between container 30 and the lateral side of frame 12, and locking portion 48 prevents the removal of bumper 20. As shown in FIG. 6, frame 12 is shaped so that along at least part of its length, it is positioned under container 30. In addition, the upper edge of each lateral side of frame 12 is shaped so that along a section of this part it is spaced away from container 30, and it is in this section of each lateral side that the generally horizontal portion 46 extends between frame 12 and container 30.

Figure 8:
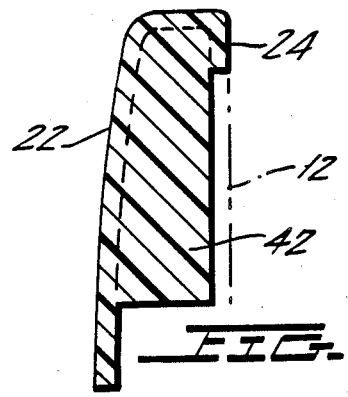
FIG. 8 is another cross-sectional view of the bumper of FIG. 4 along the line 8—8.
Figure 7:
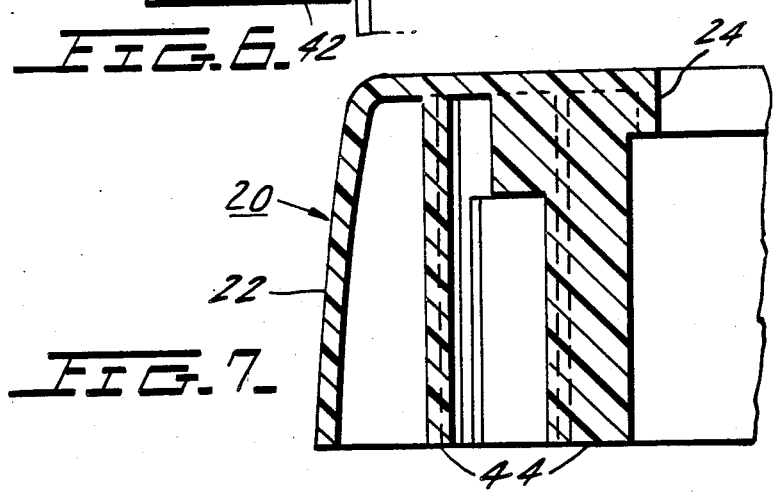
FIG. 7 is a cross-section of the bumper of FIG. 4 along the line 7—7.

FIGS. 7 and 8 show additional details of the structure of bumper 20, which may be formed as a single integral piece of plastic. FIG. 7 is a cross-sectional view through the caster wheel covering rib 44, taken along the line 7—7 in FIG. 4. As shown, caster wheel covering rib 44 is shaped to form a recess into which the upper pin of caster wheel 16 may fit if desired, and rib 44 also provides additional structural strength to bumper 20 in the area of wheels 16, a part of bumper 20 in which the separation between the vertically extending part of outer surface 22 is likely to be farthest away from inner edge 24. FIG. 8, in contrast, shows a part of bumper 20 in which the distance between the generally vertical part of outer surface portion 22 is closest to inner edge 24, at the center rib 42. In contrast to the part shown in FIG. 6, the parts of bumper 20 shown in FIGS. 7 and 8 are positioned where frame 12 is not under barrel 30, so that inner edge 24 is shaped to be positioned over frame 12 to cover it and to extend generally parallel to the wall of container 30 along the length of bumper 20.

Many specific features of bumper 20 could be modified without departing from the invention. For example, rather than being shaped for a frame 12 with two front caster wheels 16, bumper 20 could be shaped for a frame having a single front caster wheel, as disclosed in applicant's co-pending application Ser. No. 670,068, filed Nov. 13, 1984, which is incorporated herein by reference. In addition, although bumper 20 has been disclosed as an integral piece of plastic, it would be possible for bumper 20 to be made of other materials. The container around which bumper 20 fits need not be cylindrical, but could take any appropriate shape, provided that, in the section in which the generally horizontal portion of the securing element extends over the frame, the container is above the frame so that a locking portion on the inner end of the generally horizontal portion will prevent the removal of the bumper. Similarly, the locking portion of the securing element can take any appropriate shape capable of preventing the removal of the bumper.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A bumper for a cart having a frame for supporting a container, the bumper comprising:

an outer surface portion for being positioned at an outer side of the cart frame for protecting against damage in the event of collision between the cart and another object;

at least one securing element connected to the outer surface portion for securing the bumper to the cart frame, the securing element having a generally horizontal portion with an inner end for being positioned between a section of the cart frame and the container above the section of the cart frame with the inner end at an inner side of the cart frame opposite the outer side; the securing element also having a locking portion on the inner end of the generally horizontal portion for preventing the removal of the bumper when the container is on the frame;

the outer side of the frame being generally vertical, said outer surface portion of the bumper having a generally vertical part and a top covering for extending from the generally vertical part over the outer side of the frame; and said top covering having an inner edge for being disposed toward a wall of the container on the frame, the inner edge being shaped to extend generally parallel to the wall of the container.

2. The bumper of claim 1 in which the outer surface portion and the securing element are formed as a single integral piece of plastic.

3. The bumper of claim 1, further comprising ribs connected to the outer surface portion for strengthening the bumper.

4. The bumper of claim 3 in which the ribs further being for extending between the generally vertical part and the outer side of the frame for absorbing impact in the event of collision.

5. The bumper of claim 4 in which the ribs extend generally vertically and connect to the top covering.

6. The bumper of claim 1 in which the inner edge is substantially semi-circular.

7. The bumper of claim 1 in which the frame has two lateral sides, each of which has a part for extending under the container and has a front end, the frame further having a front side connected between the front ends of the lateral sides and which has a front part for extending beyond the container, the outer surface portion of the bumper being shaped for covering the front part of the front side of the frame and having first and second opposite ends disposed adjacent the lateral sides, a respective one of the securing elements being connected to each of the first and second opposite ends of the outer surface portion.

8. The bumper of claim 7 in which each of the two lateral sides of the frame has a section which is spaced apart from the container for defining a respective opening between the frame and the container, each respective securing element being for extending through the respective opening.

9. The bumper of claim 7 in which each of the respective securing elements has an inner wall, the inner wall and the locking portion of each respective securing element defining a slot for fitting over the respective lateral side of the frame.

10. The bumper of claim 1 in which each of the two lateral sides of the frame has a section which is spaced apart from the container for defining a respective opening between the frame and the container, each respective securing element being for extending through the respective opening.

11. A bumper for a cart having a frame for supporting a container, the bumper comprising:
  an outer surface portion for being positioned at an outer side of the cart frame for protecting against damage in the event of collision between the cart and another object;
  at least one securing element connected to the outer surface portion for securing the bumper to the cart frame, the securing element having a generally horizontal portion with an inner end for being positioned between a section of the cart frame and the container above the section of the cart frame with the inner end at an inner side of the cart frame opposite the outer side; the securing element also having a locking portion for preventing the removal of the bumper when the container is on the frame; and
  said outer surface portion having an inner edge for being disposed toward a wall of the container on the frame, the inner edge being shaped to extend generally parallel to the wall of the container.

12. The bumper of claim 11, further comprising ribs connected to the outer surface portion for strengthening the bumper, the outer side of the frame being generally vertical, and the outer surface portion of the bumper having a generally vertical part.

13. The bumper of claim 12 in which the outer surface portion further has a top covering for extending from the generally vertical part over the outer side of the frame, the ribs extending generally vertically and connecting to the top covering.

14. The bumper of claim 11 in which the inner edge is substantially semi-circular.

15. The bumper of claim 11 in which the securing element has an inner wall, the inner wall and the locking portion defining a slot for fitting over the frame.

16. A bumper for a cart having a frame for supporting a container, the bumper comprising:
  an outer surface portion for being positioned at an outer side of the cart frame for protecting against damage in the event of collision between the cart and another object;
  at least one securing element connected to the outer surface portion for securing the bumper to the cart frame, the securing element having a generally horizontal portion with an inner end for being positioned between a section of the cart frame and the container above the section of the cart frame with the inner end at an inner side of the cart frame opposite the outer side; the securing element also having a locking portion on the inner end of the generally horizontal portion for preventing the removal of the bumper when the container is on the frame, and
  said frame having two lateral sides, each of which has a part for extending under the container and has a front end, the frame further having a front side connected between the front ends of the lateral sides and which has a front part for extending beyond the container, the outer surface portion of the bumper being shaped for covering the front part of the front side of the frame and having first and second opposite ends disposed adjacent the lateral sides, a respective one of the securing elements being connected to each of the first and second opposite ends of the outer surface portion.

17. The bumper of claim 16 in which each of the respective securing elements has an inner wall, the inner wall and the locking portion of each respective securing element defining a slot for fitting over the respective lateral side of the frame.

* * * * *